United States Patent Office 3,773,791
Patented Nov. 20, 1973

3,773,791
GAMMA-SUBSTITUTED-GAMMA-BUTYROLAC-
TONE ADDUCTS OF O,O-DIALKYL-PHOS-
PHORODITHIOIC ACIDS
Paul G. Rodewald, Jr., Rocky Hill, N.J., Carleton N. Rowe, Lower Makefield Township, Bucks County, Pa., and El Ahmadi I. Heiba, Princeton, N.J., assignors to Mobil Oil Corporation
No Drawing. Filed May 4, 1970, Ser. No. 34,563
Int. Cl. C07d 5/06
U.S. Cl. 260—343.6                        1 Claim

ABSTRACT OF THE DISCLOSURE

This specification discloses adducts of gamma-substituted-gamma-butyrolactones with O,O-dialkyl-phosphorodithioic acids and their use as herbicides and as lubricant additives for reducing the wear of sliding steel surfaces.

BACKGROUND OF THE INVENTION

Field of the invention

This invention relates to adducts of gamma-substituted-gamma-butyrolactones with O,O - dialkyl - phosphorodithioic acid and their use as herbicides and lubricant additives.

Description of the prior art

Gamma-substituted-gamma-butyrolactones and O,O-dialkyl-phosphorodithioic acids and methods for their production are known. However, it is believed that adducts thereof and their uses are novel.

SUMMARY OF THE INVENTION

In accordance with one aspect of the invention, a gamma-substituted-gamma-butyrolactone is reacted with an O,O-dialkyl-phosphorodithioic acid in the presence of a free radical initiator to prepare an adduct thereof. In accordance with other aspects of the invention, the adducts are employed as herbicides or as agents to reduce wear between sliding steel surfaces.

DESCRIPTION OF THE PREFERRED EMBODIMENTS

In the practice of the invention, any gamma-substituted-gamma-butyrolactone can be employed. These compounds contain the moiety,

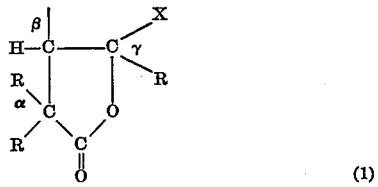

(1)

In this moiety, R can be hydrogen or any organic or inorganic radical. X is the substituent on the gamma carbon atom of the moiety and is any organic radical containing at least one carbon to carbon double or triple bond. The dangling valence on the beta-carbon atom of the moiety may be satisfied by being joined to the X group.

In Formula 1 above, R, as stated, can be hydrogen or any organic or inorganic radical. Thus, R can be a hydrocarbyl or an organyl group. The term "hydrocarbyl" designates any group containing only carbon and hydrogen such as alkyl, alkenyl, alkynyl, aryl, alkaryl, aralkyl, etc., and the term "organyl" designates groups containing carbon and hydrogen as well as other elements such as heterocyclic groups containing nitrogen, sulfur, etc. Suitable illustrative groups include methyl, ethyl, propyl, butyl, amyl, hexyl, heptyl, octyl, nonyl, decyl, undecyl, dodecyl, tetradecyl, pentadecyl, hexadecyl, octadecyl, eicosyl, hexacosyl, triacontyl, etc. These may be straight or branched chain groups. Other suitable illustrative groups include cyclopentane, cyclohexane, cycloheptane, cyclooctane, menthane, carane, and pinane. These latter groups may contain various substituents. Other suitable groups include acyl, acyloxy, alkoxy, aldehyde (—CHO), alkyl aldehyde (alkyl—CHO), amide (—CONH$_2$), alkyl amide (alkyl—CONH$_2$), alkenylmercapto (alkenyl—S), aryloxy, aroyl, aroyloxy, arylmercapto, aralkylmercapto, alkarylmercapto, carboxy (—COOH), alkylcarboxy (alkyl—COOH), alkenylcarboxy (alkenyl—COOH), cyano (—CN), alkylcyano (alkyl—CN), alkenylcyano (alkenyl—CM), a halogen like chlorine, bromine or fluorine, isocyano, nitro, thiol (—SH), various heterocyclic radicals like pyridyl and substituted pyridyl, quinolyl, isoquinolyl, acridyl, pyridazinyl, pyrimidyl, pyrazinyl, pyrazolyl, pyrrolyl, furyl, indolyl, imidazolyl, oxazolyl, thiozolyl, etc., and including these heterocyclic radical containing substituents.

In Formula 1 above, each R may be the same radical or may be different radicals.

Further, in Formula 1 above, X, as stated, is any organic radical containing at least one carbon to carbon double or triple bond. Preferably, X is of the form:

(2)

where Y is oxygen or sulfur, n is 0 or 1, and R' is an organyl group containing at least one carbon to carbon double or triple bond. The term "organyl," as mentioned above in connection with the R group, designates groups containing carbon and hydrogen as well as other elements such as heterocyclic groups containing nitrogen, sulfur, etc. Formula 2 can thus be, for example:

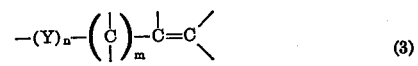

(3)

or

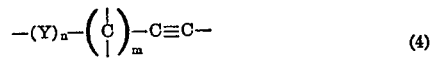

(4)

In Formulas 3 and 4, the dangling valences may be hydrogen or any organic or inorganic radical, and m is the number of the carbon atoms between the —(Y)$_n$ portion of the radical X and the double or triple bond. The number, m, can vary from 0 to 40 or more and the R' group, therefore, may contain 2 to 42 or more carbon atoms. Suitable illustrative groups include propene, butene, pentene, hexene, heptene, octene, nonene, decene, undecene, dodecene, tetradecene, pentadecene, hexadecene, octadecene, etc. These may be straight or branched chain groups. Further, the R' group may be a cyclic group. Thus, other suitable illustrative groups include cyclobutene, cyclopentene, cyclohexene, cycloheptene, cyclooctene, the various menthenes, thujenes, carene, pinenes, and bornylenes. These latter groups may contain various substituents. Heterocyclic groups, as indicated, are included. Accordingly, cyclic groups containing sulfur, nitrogen, etc. are included and these groups may also include substituents.

Returning to Formula 1 above, it was stated that the dangling valence on the beta-carbon atom of the moiety may be satisfied by being joined to the X group. In these cases, the beta- and gamma-carbon atoms of the butyrolactone, along with the X group, will form a cyclic group.

Thus, for example, a gamma-substituted-gamma-butyrolactone of this type may have the formula:

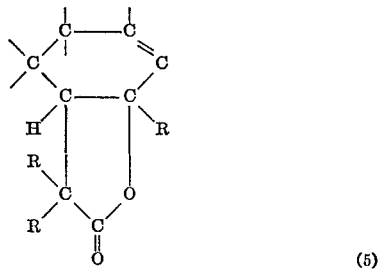

(5)

The moiety of Formula 1 may be prepared by conventional methods. However, a particularly effective method for preparing the moiety is disclosed in the copending application, Ser. No. 714,447, filed Mar. 20, 1968, now abandoned in favor of continuation-in-part application Ser. No. 30,582, filed Apr. 21, 1970, by El Ahmadi I. Heiba, one of the present applicants, and another Ralph M. Dessau. This method involves reacting, employing heat, a diolefin with a source of a free radical having the formula:

(6)

in the presence of a metal ion of higher valent form, such as manganic ion having a valence of 3. The reaction is preferably carried out in excess of the diolefin to allow the reaction to proceed at one of the olefinic double bonds.

Suitable diolefins include butadiene, 1,4-pentadiene, 1,5-hexadiene, 1,6-heptadiene, 1,7-octadiene, isoprene, biallyl and bi-methylallyl. These dienes may be substituted and may contain sulfur, nitrogen, etc. atoms as well as carbon. Suitable substituted dienes are biallyl ether, bimethylallyl ether, biallylthioether and bi-methylallylthio ether. A cyclic diene, such as cyclohexadiene, may also be employed. Other cyclic dienes, such as cyclopentadiene, fulvene, norbornadiene, cyclooctadiene, dicyclopentadiene, cycloheptatriene, cyclooctatriene, bicyclo(2,2,2)octa-2,5,7-triene, and cyclonona-1,4,7-triene, and the like, may also be employed. The cyclic compounds may be substituted and they may also be heterocyclic.

In preparing the adduct, any phosphorodithioic acid may be employed. These acids have the formula:

(7)

where R″ is an alkyl group such as an ethyl or a n-butyl group or any of the alkyl groups given above in connection with Formula 1. Preparation of the adduct is effected by reacting the gamma-substituted-gamma-butyrolactone with the O,O-dialkylphosphorodithioic acid in the presence of a free radical initiator. Free radical initiators that may be employed include chemical initiators and radiation. Chemical initiators are exemplified by peroxides, diperoxides, and peresters. Oxygen will also act as a free radical initiator with organic salts of cobalt, manganese, nickel, or iron. Radiation that will be effective includes ultraviolet radiation from a mercury arc, X-rays, gamma rays, electron bombardment, and alpha particles. The adduct is formed by the hydrogen of the —SH group of the acid joining to one of the carbon atoms of the double bond of the R′ group and the sulfur of the —SH group joining to the other of the carbon atoms of the double bond. With the double bond being at the terminal carbon atoms of an alkenyl R′ group, the adduct will have the formula:

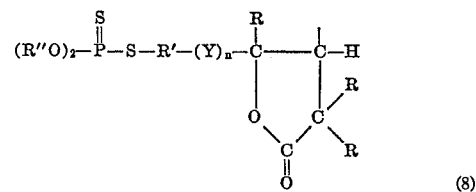

(8)

It will be understood that, in Formula 8, by the joining of the —SH group to the double bond of the R′ group of the lactone, the R′ group will no longer have a double bond.

The following example will be illustrative of the usage of gamma-substituted-gamma-butyrolactone adducts of O,O-dialkyl-phosphorodithioic acid in reducing wear between sliding steel surfaces.

In this example, friction and wear data were obtained employing four additives. One of these additives was the gamma-vinyl-gamma-butyrolacetone adduct of O,O-diethylphosphorodithioic acid. The other three additives were zinc O,O-diisopropylphosphorodithioate; zinc O,O-di(4-methyl pentyl-2) phosphorodithioate; and the vinyl acetate adduct of O,O-diisopropylphosphorodithioic acid. Each of these four additives was employed mixed in n-hexadecane. The data were obtained on a modified Shell Four-Ball Wear Machine employing balls containing 0.04 weight percent P of 52100 steel at 600 r.p.m. and 200° F. for thirty minutes with two different weights, namely, 40 kilograms and 60 kilograms. The table gives the data.

TABLE

| Additives | 40 kg. | 60 kg. |
|---|---|---|
|  | V, cc. | V, cc. |
|  | $dW$, cm.-kg. | $dW$ cm.-kg. |
| Gamma-vinyl-gamma-butyrolactone adduct of O,O-diethylphosphorodithioic acid. | {$2.0 \times 10^{-12}$<br>$1.9 \times 10^{-12}$ | $5.5 \times 10^{-12}$<br>$10.6 \times 10^{-12}$ |
| Zinc O,O-diisopropylphosporodithioate. | $63.0 \times 10^{-12}$ | $72.7 \times 10^{-12}$ |
| Zinc O,O-di(4-methylpentyl-2)-phosphorodithioate (S-393). | $28.7 \times 10^{-12}$ | $60.9 \times 10^{-12}$ |
| Vinyl acetate adduct of O,O-diisopropylphosphorodithioic acid. | $52.5 \times 10^{-12}$ | $65.5 \times 10^{-12}$ |

In the table, V signifies the volume of material worn off the steel ball in cubic centimeters, $d$ signifies the sliding distance in centimeters, and W signifies the weight of the load in kilograms.

It will be seen from the table that the adduct of the butyrolactone and the acid is an effective antiwear agent in n-hexadecane.

What is claimed is:

1. The gamma-vinyl-gamma-butyrolactone adduct of O,O-diethylphosphorodithioic acid having the formula:

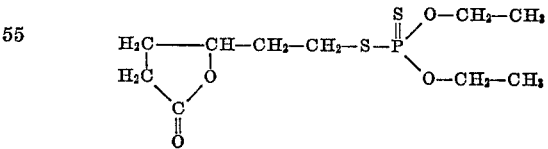

References Cited
UNITED STATES PATENTS
3,513,175   5/1970   Floyd _____ 260—343.6

ALEX MAZEL, Primary Examiner

A. T. TIGHE, Assistant Examiner

U.S. Cl. X.R.
260—343.3; 71—87; 252—46.6

UNITED STATES PATENT OFFICE
CERTIFICATE OF CORRECTION

Patent No. 3,773,791     Dated November 20, 1973

Inventor(s) Paul G. Rodewald, Jr., Carleton N. Rowe and El Ahmadi I. Heiba

It is certified that error appears in the above-identified patent and that said Letters Patent are hereby corrected as shown below:

Column 2, line 16, "(alkenyl-CM)" should be --(alkenyl-CN)--;
line 21, "radical" should be --radicals--.

Column 3, line 25, formula (6) should read

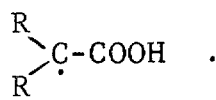

Column 4, line 19, "-butyrolacetone" should read

-- -butyrolactone--;

line 67, the Assistant Examiner should read
--A. M. Tighe--.

Signed and sealed this 9th day of April 1974.

(SEAL)
Attest:

EDWARD M. FLETCHER, JR.
Attesting Officer

C. MARSHALL DANN
Commissioner of Patents